Sept. 3, 1957　　　　　　　M. FRIMET　　　　　　2,805,081
ADJUSTABLE VEHICLE SEAT GUARD FOR PASSENGER PROTECTION
Filed Dec. 27, 1956　　　　　　　　　　　　　　2 Sheets-Sheet 1
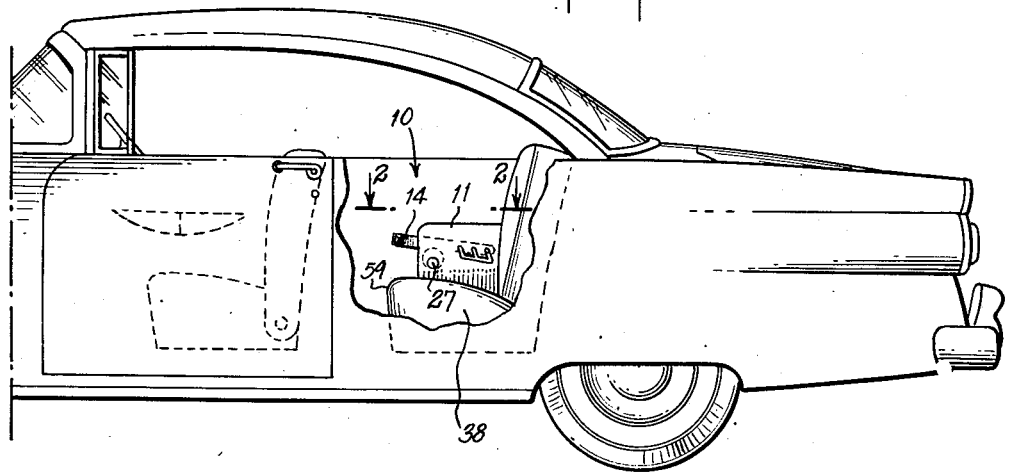
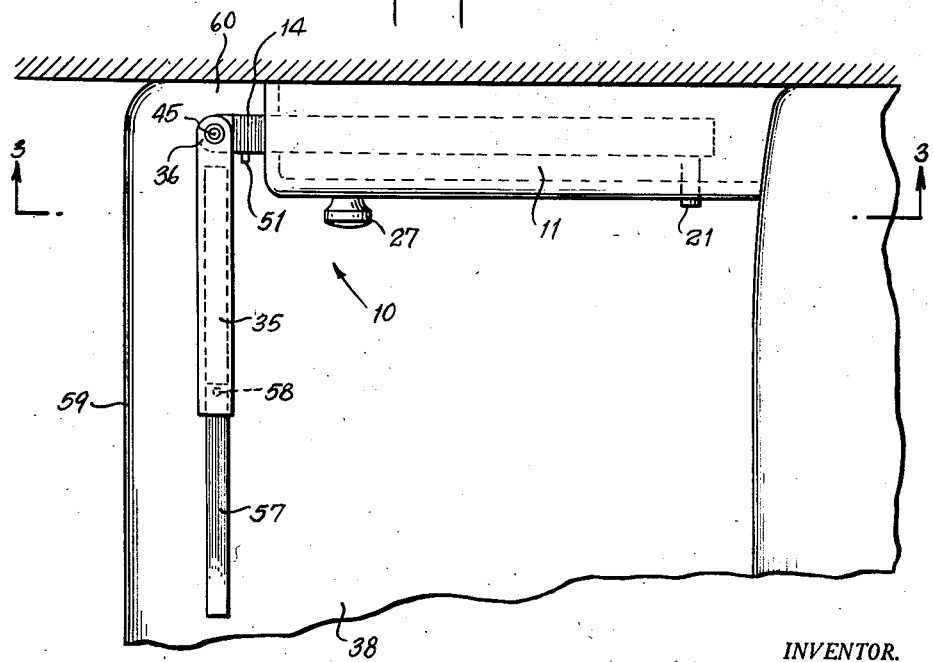
INVENTOR.
MAURICE FRIMET
BY
ATTORNEYS Sept. 3, 1957  M. FRIMET  2,805,081
ADJUSTABLE VEHICLE SEAT GUARD FOR PASSENGER PROTECTION
Filed Dec. 27, 1956  2 Sheets-Sheet 2
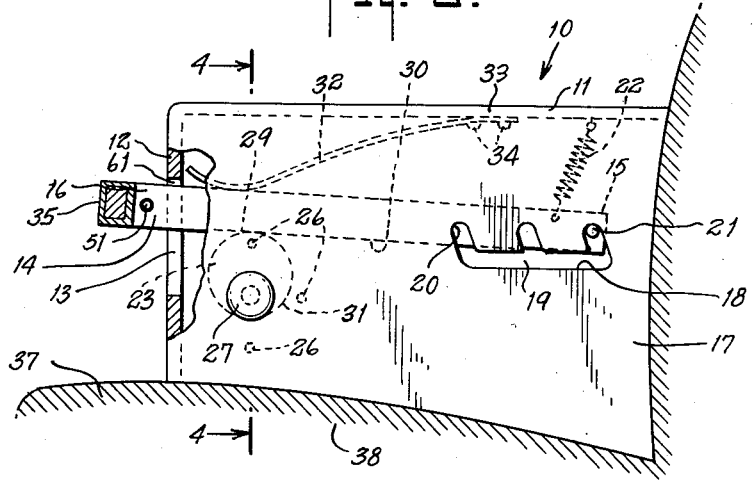
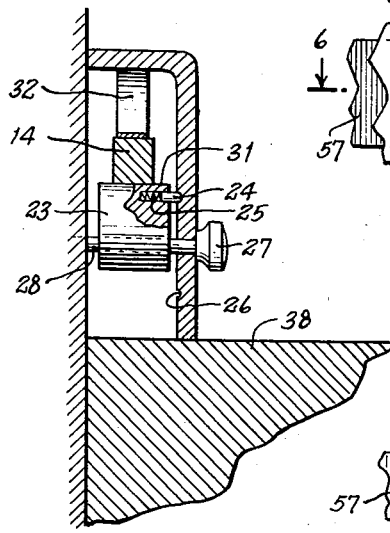
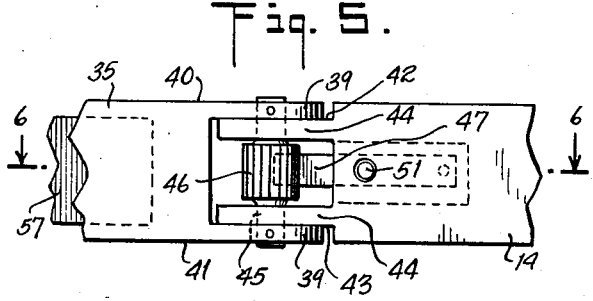
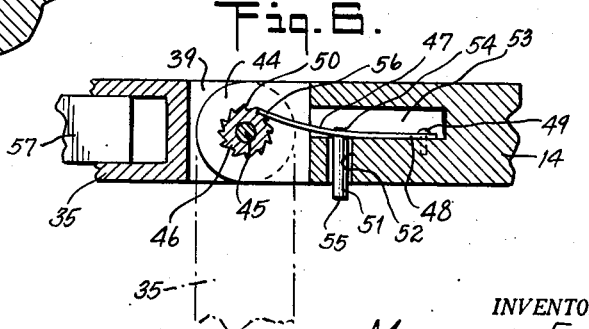
INVENTOR.
MAURICE FRIMET
BY
ATTORNEYS

United States Patent Office 2,805,081
Patented Sept. 3, 1957

2,805,081

ADJUSTABLE VEHICLE SEAT GUARD FOR PASSENGER PROTECTION

Maurice Frimet, Staten Island, N. Y.

Application December 27, 1956, Serial No. 630,975

4 Claims. (Cl. 280—150)

This invention relates to a safety guard for automobiles, and more particularly to a guard for holding passengers on the seat of an automobile.

A primary object of this invention is to provide means for holding passengers on the seat of an automobile during operation, so that they will not be thrown forward during a sudden stop, nor thrown upward when the car strikes bumps in the road, and generally to prevent injury to the passengers when the car abruptly changes its movement or direction.

An additional object of this invention is to provide such a safety device which is constructed integrally with the arm rests of the automobile. Another object is to provide such a device which is adjustable in three directions relative to the seat of the automobile.

Still another object is to provide an adjustable seat guard for an automobile which is adjustable in three directions into locked positions, yet has resilient vertical movement between preselected limiting positions.

Briefly, the present invention involves an elongated arm rest housing which is disposed alongside the automobile seat at either side of the car in the normal fashion. The housing has an opening in its forward panel and a first bar is disposed in a fore and aft direction through said opening, with its inner end portion located within said housing, and its outer end portion emergent therefrom. The inner end of the first bar has a lateral extending pin which engages a slotted portion in the side of the housing which provides means for adjusting the longitudinal disposition of the bar relative to the housing, and a spring means is provided to maintain the pin in a selected portion of the slot. An intermediate portion of the bar just inside the opening of the housing is spring biased against an eccentric cam which is releasably adjustable to one of several rotary positions to thereby position said bar vertically. A second bar is pivotally attached at one end to the outer end of the first bar, and means is provided for releasably securing the second bar in a preselected angular position relative to the first bar, so that the second bar can thereby be adjusted horizontally over the car seat. The second bar is provided with a telescoping extension for extending across the car seat and increasing the area of safety protection. The exterior surface of the housing itself is used as an arm rest and is appropriately moulded into the upholstered design of the car interior. The exterior moving parts of the safety guard, i. e. the outer end portion of the first bar, and the second bar, are likewise padded and upholstered both for safety to the passengers, as well as to blend the appearance of the device with the motif of the car interior.

Further objects of this invention will become apparent in the following description and claims, and in the drawings, in which:

Fig. 1 is a fragmentary perspective view showing the assembly of a device according to the present invention as assembled in an automobile with its external upholstery removed;

Fig. 2 is a plan view, taken along line 2—2 of Fig. 1, on a reduced scale;

Fig. 3 is a fragmentary and partially sectionalized elevation taken along line 3—3 of Fig. 2;

Fig. 4 is a fragmentary and partially sectionalized profile view taken along line 4—4 of Fig. 3;

Fig. 5 is an enlarged fragmentary elevation of the pivotal connection between the first and second bars;

Fig. 6 is a plan view taken along line 6—6 of Fig. 5.

One device embodying the features of the present invention is shown in Fig. 3. It is designated generally by the number 10, and is comprised of an external housing 11, constructed of a suitable metal such as steel or the like. At the forward end 12 of the housing 11, or at the left as viewed in Fig. 3, is a vertically elongated rectangular opening 13, through which is disposed a first bar or arm 14, having an inner end portion 15 located within the housing 11 and an outer end portion 16 located outside opening 13 thereof. The arm 14 is disposed in a general fore and aft position relative to the housing 11 and is adjustable in such fore and aft direction in a manner to be described hereinafter.

Located within the housing 11 on the outer side panel 17 thereof is a slotted portion 18 having a main fore and aft slot 19 communicating with a plurality of branch slots 20 angularly disposed therefrom in a general vertical direction. Affixed to the inner end portion 15 of bar 14 is a laterally extending pin 21 which is engageable with the slotted portion 18 in the housing 11. Coil spring 22 is affixed on opposite ends to the bar 14 and housing 11 respectively and biases the arm 14 upwardly and to the right as viewed in Fig. 3, thereby maintaining the pin 21 in the appropriately selected branch slot 20 of slotted portion 18.

Rotatively disposed in the outer side panel 17 near the opening 13 and within the housing 11 is an eccentric cam 23, manually adjustable to various rotary positions at which lug 24, biased outwardly from said cam by spring 25 engages one of the holes 26 in said panel and releasably locks the cam 23 in the desired position. Handle 27, located outside of the housing 11 and affixed to shaft 28 of the cam 23, is provided for making the aforementioned manual adjustment (see also Fig. 4).

An intermediate portion 29 of the bottom surface 30 of the bar 14 is maintained in contact with the peripheral surface 31 of the cam 23 by leaf spring 32 which is affixed at one end 33 to the housing 11 by any suitable means such as screws 34.

A second arm or bar 35 is pivotally attached at one end 36 to the first mentioned bar 14 for swinging in a general horizontal direction over the front part 37 of the car seat 38 (see Figs. 1, 2 and 3). Such rotary connection is effected in the embodiment shown by a pair of flanges 39 on the second bar 35 which are disposed respectively along the top and bottom surfaces 40 and 41 respectively of said bar 35, and are adapted to overlie the top and bottom surfaces 42 and 43 respectively of the matching flanges 44 on said first bar 14 as shown in Fig. 5. Shaft 45 passes through all of said flanges to hold them in a fixed relative position while permitting rotary motion of the second bar 35 in a horizontal direction. Mounted on shaft 45 and disposed between flanges 44 is ratchet gear 46. Leaf spring 47 is affixed at one end 48 to arm 14 by means of a metal screw or the like and bears against the teeth 50 of ratchet 46 (see also Fig. 6). The ratchet teeth 50 are disposed so as to permit counter clockwise rotation of said ratchet gear 46 as viewed in Fig. 6. Pin 51 is disposed in bore 52 communicating between spring recess 53 and the interior of the car, and said pin 51 is affixed at its inner end 54 to leaf spring 47. Inward pressure on the opposite or outer end 55 of said pin 51, or in an upward direction as viewed in Fig. 6, disengages the free end 56 of the spring 47 from ratchet gear 46 and permits rotation of the arm 35 in a forward direction, or clockwise as viewed in Fig. 6.

As shown in Fig. 2, the second arm 35 is provided with a telescoping extension arm 57 which is movable from a position almost entirely within said second bar 35, to a position as shown where it is almost entirely outside of the same. The fit of the extension 57 within the second arm 35 is such that it will remain in whichever position to which it is extended manually. Detent means such as pin 58 or the like may be provided to prevent the extension 57 from being removed entirely from the arm 35. It is of course possible to employ other means as desired to facilitate use of the extension 57. It may be spring biased inwardly with respect to the second arm 35, and ratchet means (not shown) may be utilized to maintain the extension 57 in any desired degree of extension.

All of the parts described above are preferably made of metal such as steel or the like, although it is conceivable that certain of the parts may be made of plastic or other material which has the desirable strength and impact resistance. The entire assembly, including the arm rest housing 11 and the exposed portions of the first bar 14 and the second bar 35, as well as the extension 57, are preferably covered with the usual padded upholstery to blend with the decor, as well as afford protection for the passenger against injury from impact against the device and its associated parts.

In use, the device is normally found with the extension 57 pushed back into the arm 35, and the arm 36 extending either outwardly over the front portion 59 of the seat 38 or outwardly over the outer edge 60 of the seat. After the passenger has taken his proper position on the car seat the second arm 35 is pulled in a general horizontal direction around over the seat and over the passenger's legs to a position generally as shown in Fig. 2 where the second arm 35 is generally perpendicular to the first arm 14. The first arm may then be adjusted into its desired fore and aft position relative to the arm rest housing 11 by appropriate manipulation of the outer end portion 16 to first position lateral pin 21 on the inner end 15 of arm 14 in the desired branch slot 20. This having been accomplished, eccentric cam 23 is then rotated by means of knob 27 to place arms 14 and 35 at the desired vertical elevation with respect to the seat 38. A vertical position is selected to afford the passenger comfort while yet providing sufficient safety. It is to be noted that even with the eccentric cam 23 in its position of maximum elevation as shown in Fig. 3, a slight clearance exists between the first arm 14 and the top edge 61 of opening 13 in the housing 11 so that the arms 14 and 35 will have a limited degree of resilient vertical movement. This latter feature has been found to not only enhance the comfort of the passenger but also to provide a cushioning effect against abrupt upward movement of the passenger's legs against the bar 35. The bar having been appropriately adjusted in the foregoing manner, the extension 57 is then adjusted to the outward extent desired.

In addition to the features described above, it is also possible to provide the second arm 35 with finger grips (not shown) to not only facilitate repositioning of the same, but also enable the passenger to maintain a firm hold on said arm during use if so desired.

This invention is adaptable for use in rear seats as well as front seats of automobiles, and can either be built in during manufacture of the car itself, or can be manufactured as an accessory for installation on cars already in use.

While one embodiment of this invention has been shown and described above, it is to be understood that certain changes and additions can be made thereto without departing from the scope and spirit of the invention.

I claim:

1. An adjustable seat guard for an automobile comprising an elongated arm rest housing adapted for substantially horizontal disposition alongside a seat, said housing having a vertically enlarged opening therein, a first bar disposed through said opening with an inner end portion located within said housing and an outer end portion emergent therefrom, a first means adjustably interconnectable between said first bar and said housing for positioning said first bar so as to vary the length of said emergent portion, a second means affixed to said housing and engageable with said first bar for adjusting said first bar vertically with respect to said opening, a second bar swingably attached at one end to said outer end portion of said first bar and being adapted for disposition relative to said seat, and means affixed to said first and second bars for releasably positioning said second bar in a preselected angular position relative to said first bar, whereby said second bar is disposed horizontally over said seat.

2. An adjustable seat guard for an automobile comprising an elongated arm rest housing adapted for substantially horizontal disposition alongside a seat, said housing having a forwardly disposed vertically enlarged opening therein, a first bar disposed through said opening with an inner end portion located within said housing and an outer end portion emergent therefrom, a slotted portion in said housing having a fore and aft main slot interconnecting a plurality of branch slots angularly disposed therefrom, a laterally disposed pin on said inner end portion of said first bar engageable with all of said slots, spring means interconnected with said housing and said first bar for biasing said first bar inwardly with respect to said opening and said pin into said slots, a second means affixed to said housing and engageable with said first bar for adjusting said first bar vertically with respect to said opening, a second bar swingably attached at one end to said outer end portion of said first bar and being adapted for disposition relative to said seat, and means affixed to said first and second bars for releasably positioning said second bar in a preselected angular position relative to said first bar, whereby said second bar is disposed horizontally over said seat.

3. An adjustable seat guard for an automobile comprising an elongated arm rest housing adapted for substantially horizontal disposition alongside a seat, said housing having a vertically enlarged opening therein, a first bar disposed through said opening with an inner end portion located within said housing and an outer end portion emergent therefrom, a first means adjustably interconnectable between said housing and said first bar for positioning said first bar so as to vary the length of said emergent portion, an eccentric cam rotatively mounted within said housing and having an external knob means for positioning the same, said cam engageable with an intermediate portion of said first bar, spring means affixed to said housing and engageable with said first bar for urging said first bar into contact with said cam, means affixed to said cam and engageable with said housing for releasably maintaining said cam in preselected positions to vary the vertical disposition of said first bar relative to said opening, a second bar swingably attached at one end to said outer end portion of said first bar and being adapted for disposition relative to said seat, and means affixed to said first and second bars for releasably positioning said second bar in a preselected angular position relative to said first bar, whereby said second bar is disposed horizontally over said seat.

4. An adjustable seat guard for an automobile comprising an elongated arm rest housing adapted for substantially horizontal disposition alongside a seat, said housing having a forwardly disposed vertically enlarged opening therein, a first bar disposed through said opening with an inner end portion located within said housing and an outer end portion emergent therefrom, a slotted portion in said housing having a fore and aft main slot interconnecting a plurality of branch slots angularly disposed therefrom, a laterally disposed pin on said inner end portion of said first bar engageable with all of said slots, spring means interconnected with said housing and said first bar for biasing said first bar inwardly with respect to said opening and said pin into said slots, an eccentric cam rotatively mounted within said housing and having an external knob means for positioning the same, said cam engageable with an intermediate portion of said first bar, spring means affixed to said housing and engageable with said first bar for urging said first bar into contact with said cam, means affixed to said cam and engageable with said housing for releasably maintaining said cam in preselected positions to vary the vertical disposition of said first bar relative to said opening, a second bar swingably attached at one end to said outer end portion of said first bar and being adapted for disposition relative to said seat, and means affixed to said first and second bars for releasably positioning said second bar in a preselected angular position relative to said first bar, whereby said second bar is disposed horizontally over said seat, and a telescopic extension arm slidably disposed within said second bar and being extensible longitudinally from the free end of said second bar.

References Cited in the file of this patent

UNITED STATES PATENTS

| | | |
|---|---|---|
| 534,674 | Schwarzmiller | Feb. 26, 1895 |
| 1,619,697 | Brown | Mar. 1, 1927 |
| 2,245,899 | Campbell | June 17, 1941 |
| 2,717,162 | Walters | Sept. 6, 1955 |
| 2,749,143 | Chika | June 5, 1956 |

FOREIGN PATENTS

| | | |
|---|---|---|
| 1,008,155 | France | Feb. 13, 1952 |